United States Patent [19]

Negoro

[11] Patent Number: 4,557,594

[45] Date of Patent: Dec. 10, 1985

[54] MAGNIFICATION VARYING DEVICE FOR COPYING MACHINE

[75] Inventor: Ikuo Negoro, Tokyo, Japan

[73] Assignee: Asahi Kogaku Kogyo Kabushiki Kaisha, Tokyo, Japan

[21] Appl. No.: 642,904

[22] Filed: Aug. 21, 1984

[30] Foreign Application Priority Data

Sep. 8, 1983 [JP] Japan ............................... 58-165757

[51] Int. Cl.[4] ....................... G03B 27/36; G03B 27/38

[52] U.S. Cl. ........................................ 355/58; 355/66

[58] Field of Search ....................... 355/56, 57, 58, 59, 355/66

[56] References Cited

U.S. PATENT DOCUMENTS 4,107,714 8/1978 Raab ..................................... 355/58

4,397,544 8/1983 Yajima et al. ......................... 355/58

*Primary Examiner*—Monroe H. Hayes

*Attorney, Agent, or Firm*—Sughrue, Mion, Zinn, Macpeak & Seas

[57] ABSTRACT

A magnification varying device for a copying machine in which a variable magnification zoom lens is arranged between an original surface and a photosensitive surface and the copying magnification is varied by moving the movable lens groups, both with respect to the original and photosensitive surfaces and also with respect to one another. One of the movable lens groups is fixed to a slide plate which is movably supported to be slidable in a direction parallel to the optical axis of the zoom lens. The other lens group is slidable on the slide plate relative to the first lens group. A cam plate having a cam surface is arranged along the line of movement of the slide plate. A cam lever is pivotally mounted on the slide plate and has one arm acting as a cam follower engaged with the cam surface and the other end engaged with a pin coupling it to the second lens group.

9 Claims, 7 Drawing Figures

MAGNIFICATION VARYING DEVICE FOR COPYING MACHINE

BACKGROUND OF THE INVENTION

The present invention relates to a variable magnification type copying machine using a zoom lens, and more particularly to a mechanism for moving the movable lens components in the zoom lens.

FIG. 1 shows, from top to bottom, the positions of a movable front lens group L1 and a movable rear lens group L2 of a zoom lens in the direction of the optical axis when the magnification is larger than one (enlargement), one (life size) and smaller than one (reduction), and the loci of the two lens groups in moving between these positions, wherein the original platen D and the photosensitive surfaces are stationary, that is, with the distance between the object and the image being held unchanged.

FIGS. 2 and 3 show an example of the construction of a conventional copying machine magnification varying device which is used to move the front lens group L1 and the rear lens group L2 along the loci shown in FIG. 1 above. In FIG. 2, the original platen D, the front lens group L1 and the rear lens group L2 are the same as those in FIG. 1, and the photosensitive surface S is a photosensitive drum. A full-speed mirror M1, arranged below the original platen D and made of a transparent glass plate, runs together with an illuminating lamp R1. Furthermore, optical path changing mirrors M2 and M3 for receiving a light beam reflected from the full-speed mirror M1 are supported below the original platen D and moved as one unit. In order to maintain the length of the optical path unchanged, the mirrors M2 and M3 are moved in the same direction as the full-speed mirror M1 and at half of the speed of the full-speed mirror M1. For this reason, the mirrors M2 and M3 in combination are called "half-speed" mirrors. The optical path changing mirrors M2 and M3 reflect the light beam from the full-speed mirror M1 so that the light beam is applied through the zoom lens L to a fourth mirror M4. The fourth mirror M4 applies the light beam to the photosensitive drum S, which rotates in synchronization with the scanning of the full speed mirror M1 (speed of the full-speed mirror M1=(1/magnification)×peripheral speed of the drum S). In order to change the magnification, the movable lens groups L1 and L2 of the zoom lens are moved along the optical axis and the distance between the two lens groups is set as shown in FIG. 1.

FIG. 3 shows an example of a conventional mechanism for moving the movable lens groups L1 and L2. In the lens moving mechanism, the force of movement of the front lens group L1 is utilized to move the rear lens group L2 through a cam. In FIG. 3, reference character F designates the optical axis of the zoom lens L, and 11, a guide bar which is fixedly mounted on supporting brackets 13 provided on a base plate 12 and extends parallel to the optical axis F. A zoom lens mounting frame 14 is slidably mounted on the guide bar 11. Guide rollers 15 at one end of the zoom lens mounting frame 14 roll on a guide rail 16 which is fixed on the base plate 12 and is arranged parallel to the guide bar 11.

A first lens barrel 17 supporting the front lens group L1 is fixed to the zoom lens mounting frame 14. A second lens barrel 18 is supporting the rear lens group L2 is slidably arranged on the first lens barrel 17 in such a manner that the optical axes of the two lens groups are in alignment with each other. With respect to the zoom lens mounting frame 14, the first lens barrel 17 is stationary while the second lens barrel 18 is movable. An arm 21 extends from one end of the zoom lens mounting frame 14. A feed screw 22 is supported by the supporting brackets 13 and extends parallel to the guide bar 11. The feed screw 22 thus supported is threadedly engaged with the arm 21 extending from the mounting frame 14. The feed screw 22 is turned by a stepping motor (or a pulse motor) 23 whose angular position is controllable via a timing pulley 24, a timing belt 25 and a timing pulley 26.

A shaft 28 is supported by the zoom lens mounting frame 14 and is mounted perpendicular to the optical axis. A distance adjusting member, namely a cam plate 29, is rotatably mounted on the shaft 28. A cam follower 30 protrudes from the second lens barrel 18 and extends to a point where it contacts the peripheral cam surface of the cam plate 29. A tension spring 31 is provided to maintain the cam plate 29 in contact with the cam follower 30. When the cam plate 29 rotates, the second lens barrel 18 is moved along the optical axis F along a locus determined according to the configuration of the cam surface of the cam plate 29. The cam plate 29 is shaped so that the rear lens group L2 supported by the second lens barrel 18 is moved along the locus G shown in FIG. 1.

A wire driving pulley 33 is mounted on the shaft of the cam plate 29. The wire driving pulley 33 is movable relative to the cam plate 29 so as to adjust the relative rotational phase therebetween. The wire driving pulley 33 is fixedly mounted on the shaft of the cam plate 29 after phase adjustment. A wire 35 is secured to the wire driving pulley 33 with a small screw or the like and is then wound on the wire driving pulley 33. The two ends of the wire 35 are fastened to respective ones of the supporting brackets 13.

In the conventional device thus constructed, as the stepping motor 23 rotates the feed screw 22, the zoom lens mounting frame 14 is moved along the guide bar 11 so that the zoom lens L, including the front lens group L1 and the rear lens group L2, is moved in the direction of the optical axis F. In this operation, the zoom lens mounting frame 14 describes a locus corresponding to the locus E of the front lens group L1 in FIG. 1 with the distance of movement depending on the copying magnification.

The middle part of the wire 35, both ends of which are fixedly held, is secured to the wire driving pulley 33 so that the wire will not slide on the wire driving pulley. Therefore, as the zoom lens mounting frame 14 is moved, the wire driving pulley 33, and accordingly the cam plate 29 coaxial with the wire driving pulley, rotates through an angle corresponding to the amount of movement of the zoom lens mounting frame 14. Therefore, the second lens barrel 18 is moved in conformance with the configuration of the cam plate 29 through the cam follower 30, which is elastically in contact wih the former, so that the distance between the front lens group L1 and the rear lens group L2 is set to a value corresponding to the required magnification, that is, the rear lens group is moved along the path G in FIG. 1.

The above-described conventional device suffers from the following difficulties: Since the cam plate 29, the wire driving pulley 30, etc., must be arranged beside or near the lens in such a manner that they are perpendicular to the optical axis of the lens, the device is necessarily bulky. Furthermore, as the lens barrels 17 and 18 for the front and rear lens groups L1 and L2 and the relevant components are intricate in construction, the manufacturing cost is relatively high. Still further, because the wire 33 is low in dimensional accuracy, it is essential to make a phase adjustment to the wire driving pulley 33 and the cam 29 in the assembly process. That is, assembling the device is rather difficult. As the cam plate 29 is disc shaped, the diameter of the wire driving pulley 33 must be such that the wire driving pulley 33 makes substantially one revolution for the total amount of movement of the front lens group L1. Accordingly, if it is required to increase the total amount of movement, it is necessary to increase the diameter of the pulley, and thus it is necessary to increase the height of the device.

SUMMARY OF THE INVENTION

The present invention has been developed to eliminate the above-described difficulties accompanying a conventional magnification varying device for copying machines. A specific feature of a magnification varying device according to the invention is that one of two movable lens groups of the zoom lens is fixedly secured to a slide plate which is movably supported by a base plate, while the other movable lens group is supported on the slide plate in such a manner that it is moved in association with the swinging motion of a cam lever having a cam follower at the free end, and as the slide plate is moved, the distance between the two movable lens groups is varied to achieve a specified magnification by the cam lever guided by a cam surface extending in the direction of movement of the slide plate with the cam follower provided on the cam lever held in contact therewith.

DESCRIPTION OF THE PREFERRED EMBODIMENTS

Figure 4:
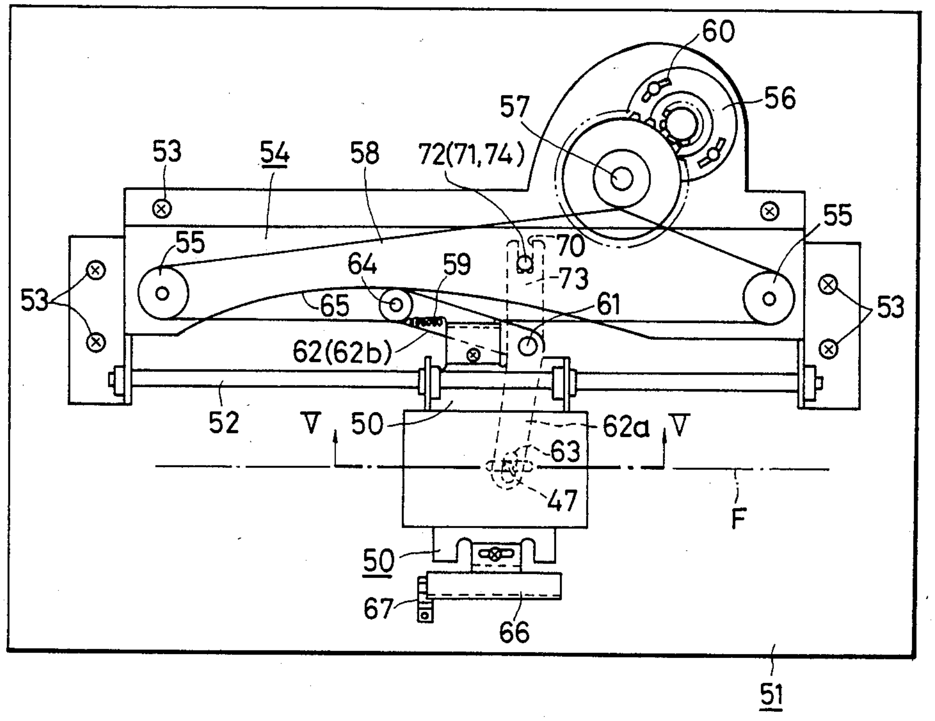
FIG. 4 is a plan view showing an example of a magnification varying device according to the invention.

The invention will now be described with reference to a preferred embodiment shown in FIGS. 4 and 5.

Figure 5:
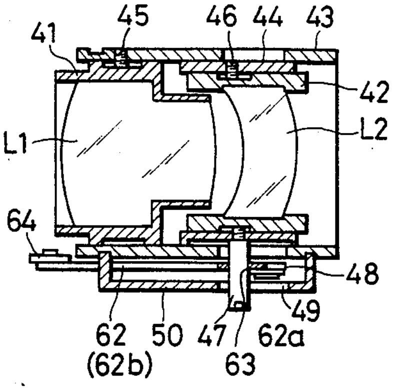
FIG. 5 is a cross-sectional view taking along a line V—V in FIG. 4.
Figure 6:
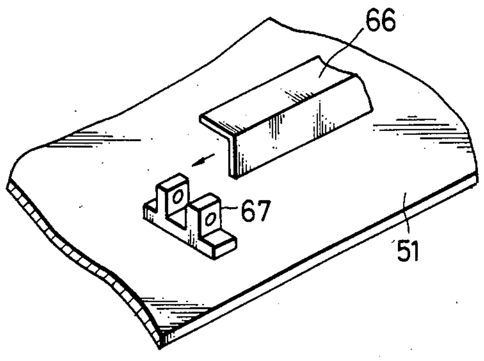
FIG. 6 is a perspective view showing essential components of an example of a slide plate position detector.

In FIG. 5, a front lens group L1 and a rear lens group L2 are the same as those of the zoom lens L in the conventional device. The front lens group L1 and the rear lens group L2 are fixedly supported in a front lens barrel 41 and a rear lens barrel 42, respectively. The front lens barrel 41 is fitted in a housing 43, while the rear lens barrel 42 is fitted in a sliding cylinder 44 which is fitted in the housing 43 in such a manner as to be slidable in the direction of the optical axis. The front lens barrel 41 and the rear lens barrel 42 are rotatable and movable along the optical axis in the housing 43 and the sliding cylinder 44 before assembly. After focus adjustment, the lens barrels 41 and 42 are fixedly secured to the housing 43 and the sliding cylinder 44 with screws 45 and 46, respctively. An interlocking pin 47 is fixed to the sliding cylinder. The pin 47, which passes through a groove 48 in the housing 43 and extends parallel to the optical axis, is used to move the sliding cylinder 44 in the direction of the optical axis. The pin 47 further extends through an interlocking window 49 in a slide plate 50 which fixedly supports the housing 43. Accordingly, moving the interlocking pin 47 in the direction of the optical axis causes the rear lens group L2 to move towards or away from the front lens group L1.

The slide plate 50 is slidably mounted on a guide shaft 52 above a base plate 51, the latter being reciprocatable along the guide shaft 52. The guide shaft 52 is fixedly secured to both end portions of a cam plate 54 which is fixedly mounted on the base plate 51 with screws 53. The guide shaft is used to guide the front lens group L1 and the rear lens group L2 of the zoom lens L along the optical axis F.

Pulleys 55 are provided at end portions of the cam plate 54, and a wire driving pulley 57 driven by a stepping motor 56 is provided on the upper part of the cam plate 54. A wire 58 is laid over the pulleys 55 and around the wire driving pulley 57. One end of the wire 58 is fastened to the slide plate 50, while the other end is fastened through a tension spring 59 to the slider plate 50. The tension spring 59 is provided to absorb any shock which may occur when the slide plate 50 starts or stops, to correct for any initial dimensional error of the wire 58, and to correct for any stretching of the wire 58 which may occur over time. The stepping motor 56 has arcuate mounting holes 60 for phase adjustment.

Figure 1:
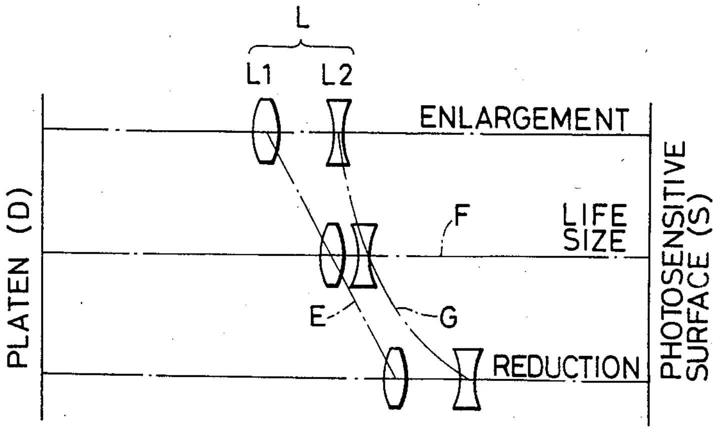
FIG. 1 PRIOR ART
FIG. 1 is a diagram showing the movement of a zoom lens with respect to an original surface (platen) and a photosensitive surface as the magnification is varied in a copying machine.
Figure 2:
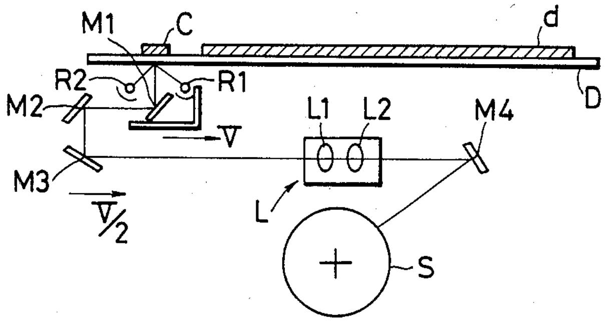
FIG. 2 PRIOR ART
FIG. 2 is an explanatory diagram outlining the general optical path system in a conventional variable magnification type copying machine.
Figure 3:
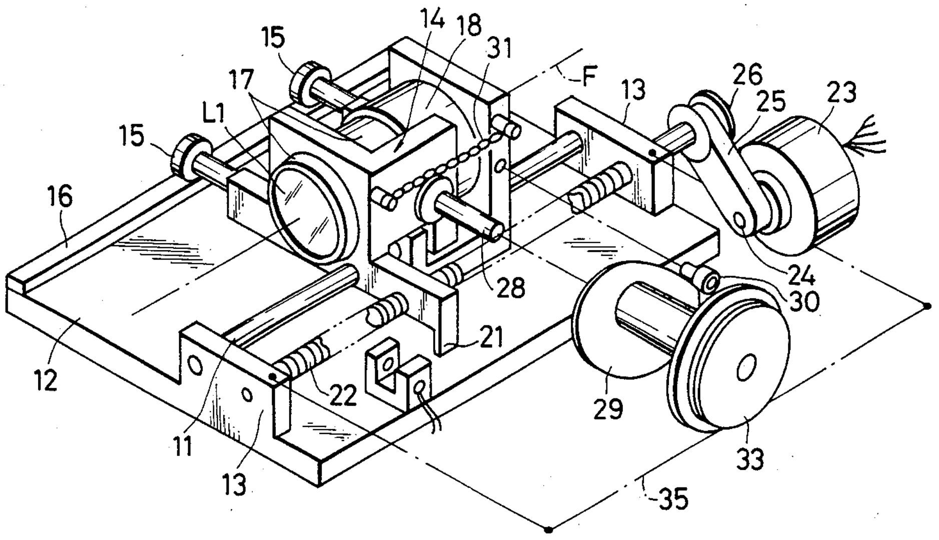
FIG. 3 PRIOR ART
FIG. 3 is a perspective view showing an example of a conventional zoom lens moving mechanism.

A cam lever 62 is pivotally mounted on a pin 61 fixed to the slide plate 50. The cam lever 62 is substantially L shaped. The cam lever 62 includes an arm 62*a* extending towards the sliding cylinder 44, and an arm 62*b* extending towards the cam plate 54. An elongated groove 63, formed in the arm 62*a*, receives the interlocking pin 47. The other arm 62*b* has a cam follower 64. The cam follower 64 is urged by a spring (not shown), such as a torsion spring wound on the pin 61, into contact with the cam surface 65 of the cam plate 54. The cam surface 65 is shaped so that, in combination with the movement of the slide plate 50, the rear lens group L2 is caused to move along the path G indicated in FIG. 1.

A position detecting plate 66 is secured to one end portion of the slide plate 50 opposite to the end where the cam lever 62 is provided. The position of the position detecting plate 66 is adjustable in the direction of the optical axis. The position detecting plate 66 is allowed to pass through the U-shaped part of a photointerruptor 67 secured to the base plate 51. The enlargement range is indicated when the position detecting plate 66 is in the photointerruptor 67, interrupting the transmission of light, and the reduction range is indicated when the position detecting plate 66 is not in the photointerruptor 67, allowing the transmission of light. The life-size magnification position corresponds to the position where the position detecting plate 66 just starts interrupting the transmission of light in the photointerruptor 67, that is, the position where the output of the photointerruptor 67 changes abruptly. The position detector composed of the position detecting plate 66 and the photointerruptor 67 is used also in the conventional device. Therefore, the construction of the position detector is not important to the invention.

Figure 7:
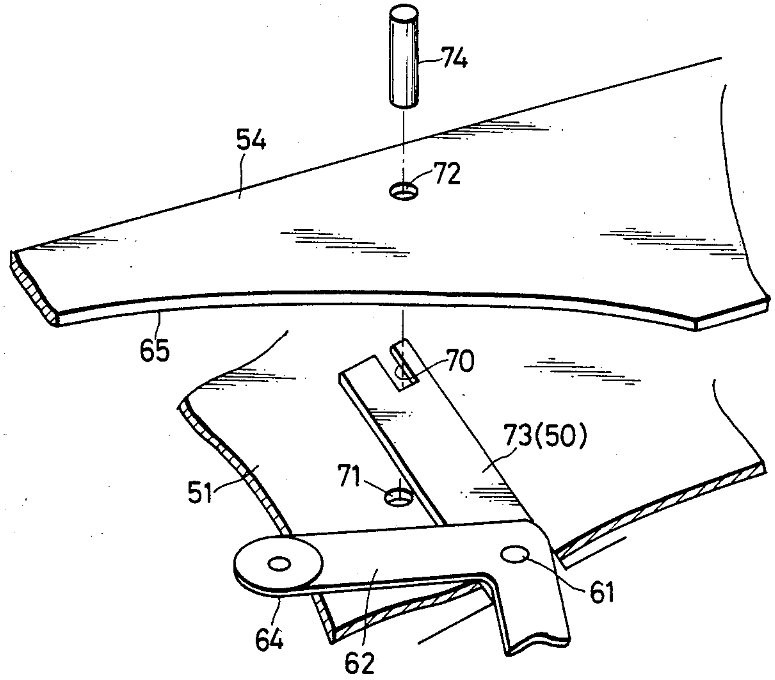
FIG. 7 is a perspective view showing essential components of an example of a mechanism for positioning the slide plate, a base plate and a cam plate in the device of the invention.

As is clearly shown in FIG. 7, an elongated groove (or an elongated hole) 70, a small hole 71 and a small hole 72 are formed in the slide plate 50, the base plate 51 and the cam plate 54, respectively, which are used for positioning during assembly. The elongated groove 70 is formed in the positioning arm 73 (a portion of the slide plate 50) which extends below the cam plate 54 with the elongated groove 70 extending in a direction perpendicular to the direction of movement of the slide plate 50. The position of the elongated groove 70, the small hole 71 and the small hole 72 are determined so that, with a positioning pin inserted into the groove 70 and the small holes 71 and 72, the relevant elements are fixed to set the lenses for a magnification of X1, for instance. After assembly, the positioning pin 74 is removed from the device. The reason why, instead of a hole, the elongated groove 70 is employed for positioning the slide plate 50 is that the slide plate 50 should be positioned in the direction of movement thereof and insertion of the positioning pin 74 can be readily achieved with the elongated groove 70. Of course, positioning may be performed for an enlargement or reduction position where a predetermined nonunity magnification is obtained.

In the device thus constructed, when the stepping motor 56 is driven, the slide plate 50, and accordingly the zoom lens L including the front lens group L1 and the rear lens group L2, is moved along the optical axis F using the wire driving pulley 57, the pulleys 55 and the wire 58, while the rear lens group L2 is moved towards the front lens group L1 due to the action of the cam surface 65, the cam follower 64, the cam lever 62, the interlocking groove 63, the interlocking pin 47 and the rear lens barrel. In this case, the loci of the front lens group L1 and the rear lens group L2 coincides with the movement curves E and G in FIG. 1. Accordingly, good focusing and hence a clear copy is obtained for each magnification setting. The slide plate 50 can be moved to each magnification position by the stepping motor 56. The magnification may be changed gradually or stepwise as required.

In the device of the invention, unlike the conventional device, the position of the rear lens group L2 is regulated by the cam lever 62 and the cam surface 65, and the latter is horizontally extended, being formed along the path of movement of the slide plate 50. Therefore, the device of the invention can be miniaturized, and especially can be made small in height. Furthermore, the device of the invention has a smaller number of components and is simpler in the configuration of components that the conventional device. Accordingly, the components can be readily machined and are high in accuracy and stability. Thus, the device can be manufactured at a low cost.

The lens barrel unit shown in FIG. 5 and the other units can be assembled separately; that is, the device can be assembled using a so-called subassembly technique. Further, in the device of the invention, unlike the conventional one, adjustment of the phase between the cam plate and the wire driving pulley is eliminated. Thus, the device of the invention can be more quickly assembled.

In assembling the slide plate 50, the base plate 51 and the cam plate 54, the elongated groove 70 and the small holes 71 and 72 can be utilized as described above. That is, these plates can be readily assembled with one positioning pin 74. This is another advantage of the invention.

In the above-described embodiment, the technical concept of the invention is applied to a copying machine of the type where the original platen is stationary. However, the technical concept of the invention is applicable also to a copying machine of the type where the original platen is movable. The above-descried embodiment relates to a copying machine in which the optical axis F of the zoom lens is parallel to the guide shaft 52. However, it should be noted that the technical concept of the invention is applicable also to a copying machine of the type in which the optical axis forms an angle with the guide shaft.

As is apparent from the above description, in the magnification varying device according to the invention, the cam plate fixedly secured to the base plate has a cam surface extending in the direction of movement of the slide plate which supports the zoom lens. The cam follower on the cam lever for moving one of the movable lens groups relative to one another is abutted against the cam surface so that the distance between the movable lens groups is varied with the movement of the slide plate. Therefore, the device of the invention can be made small in height when compared to the conventional device using a rotary cam plate. That is, the device of the invention can be miniaturized in its entirety. Furthermore, adjustment of the device is substantially unnecessary during assembly. Therefore, the device can be readily assembled, its reliability and accuracy are high, and maintenance readily achieved.

I claim:

1. In a magnification varying device for a copying machine in which a variable magnification zoom lens is arranged between an original surface and a photosensitive surface and a copying magnification is varied by moving the movable lens groups in said zoom lens, the improvement wherein:

one of said movable lens groups of said zoom lens is fixedly secured to a slide plate which is movably supported on a base plate, and the other movable lens group is supported on said slide plate in such a manner as to be moved in association with swinging movement of a cam lever having a cam follower at a free end thereof, and a cam plate fixedly secured to said base plate has a cam surface extending in a direction of movement of said slide plate so that said cam follower of said cam lever is held in contact with said cam surface, wherein, as said slide plate is moved, the distance between said movable lens groups is varied continuously with the aid of said cam surface and cam lever according to a selected magnification.

2. The magnification varying device as claimed in claim 1, in which positioning means is provided for assembling said cam plate, slide plate and base plate.

3. A magnification varying device for a copying machine including a variable magnification zoom lens arranged between an original surface and a photosensitive surface, said zoom lens including first and second lens groups, comprising:

a slide plate, said slide plate being slidably mounted to slide in a direction parallel to an optical axis of said zoom lens, said first lens group being fixed to said slide plate, and said second lens group being slidably mounted on said slide plate to slide relative to sàid first lens group;

a fixedly mounted cam plate having a cam surface extending adjacent a line of movement of said slide plate; and a cam lever pivotally mounted on said slide plate, said cam lever having a first arm including a cam follower in sliding engagement with said cam surface and a second arm coupled to said second lens group for moving said second lens group relative to said first lens group as said slide plate is moved with said cam follower following said cam surface.

4. The magnification varying device of claim 3, further comprising first and second pulleys rotatably mounted at opposite ends of said cam plate; a wire laid around said first and second pulleys and engaged with said slide plate; and means for selectively moving said wire to move said slide plate.

5. The magnification varying device of claim 3, further comprising a positioning arm pivotally coupled at one end to said slide plate and having an elongated groove formed in the other end, and wherein positioning holes are provided in said cam plate and said slide plate which, when aligned with said elongated groove in said positioning arm, position said zoom lens for a predetermined magnification.

6. The magnification varying device of claim 3, further comprising means for detecting a position of said slide plate.

7. The magnification varying device of claim 6, wherein said position detecting means comprises a photointerruptor and a position detecting plate fixedly attached to said slide plate, said photointerruptor being positioned to detect an edge of said position detecting plate.

8. The magnification varying device of claim 3, wherein said zoom lens comprises a housing fixed to said slide plate, a first lens barrel for fixedly mounting said first lens group to said housing, a second lens barrel slidably mounting said second lens group in said housing, and an interlocking pin coupling said second lens barrel to said second arm of said cam lever.

9. The magnification varying device of claim 8, wherein said interlocking pin passes through an elongated hole formed in said slide plate.

* * * * *